United States Patent [19]
Swartzel et al.

[11] Patent Number: 5,670,199
[45] Date of Patent: Sep. 23, 1997

[54] METHOD FOR PASTEURIZING LIQUID WHOLE EGG PRODUCTS

[75] Inventors: Kenneth R. Swartzel; Sevugan Palaniappan, both of Raleigh, N.C.

[73] Assignee: North Carolina State University, Raleigh, N.C.

[21] Appl. No.: 686,509

[22] Filed: Jul. 26, 1996

Related U.S. Application Data

[63] Continuation of Ser. No. 370,228, Jan. 9, 1995, abandoned, which is a continuation of Ser. No. 862,862, Apr. 3, 1992, abandoned.

[51] Int. Cl.$^6$ .................................................. A23L 1/32
[52] U.S. Cl. .................... 426/614; 426/237; 426/238; 426/244; 426/521
[58] Field of Search ................................ 426/234, 237, 426/238, 244, 465, 521, 614; 99/538, DIG. 1, 451; 219/477, 480, 482, 10.81

[56] References Cited

U.S. PATENT DOCUMENTS

| | | |
|---|---|---|
| 1,813,064 | 7/1931 | Matzka . |
| 3,651,753 | 3/1972 | Schmidt ................................ 99/358 |
| 3,996,385 | 12/1976 | Vigerström ........................ 426/244 |
| 4,417,132 | 11/1983 | Simpson ............................. 219/291 |
| 4,695,472 | 9/1987 | Dunn et al. ......................... 426/237 |
| 4,739,140 | 4/1988 | Reznik et al. ..................... 219/10.81 |
| 4,808,425 | 2/1989 | Swartzel et al. . |
| 4,838,154 | 6/1989 | Dunn et al. ......................... 99/451 |
| 4,957,759 | 9/1990 | Swartzel et al. . |
| 4,957,760 | 9/1990 | Swartzel et al. . |
| 4,994,291 | 2/1991 | Swartzel et al. . |
| 5,019,407 | 5/1991 | Swartzel et al. . |
| 5,019,408 | 5/1991 | Swartzel et al. . |
| 5,048,404 | 9/1991 | Bushnell et al. .................... 99/451 |
| 5,167,976 | 12/1992 | Papetti . |
| 5,290,583 | 3/1994 | Reznik et al. ...................... 426/614 |

FOREIGN PATENT DOCUMENTS 2 513 087  9/1981  France .

OTHER PUBLICATIONS

*Egg Pasteurization Manual*, USDA, Agricultural Research Service, 1969.
APV Crepaco, Inc., *Aseptic/Extended Shelf Life Processing Handbook*.
Skudder, *New System for the Sterilisation of Particulate Food Products by Ohmic Heating*, APV Baker Automation Process Division, Crawley, U.K.
Biss et al., *The Development and Application of Ohmic Heating for the Continuous Heating of Particulate Foodstuffs*, APV International Limited, Crawley, West Sussex.
Reznik, *Electroheating*™, Raztek Corporation (1989).
Palaniappan et al., *Electrical Conductivity of Selected Juices: Influences of Temperature, Solids Contents, Applied Voltage, and Particle Size*, Journal of Food Process Engineering, 14, 247–260 (1991).
De Alwis et al., *Shape and Conductivity Effects in the Ohmic Heating of Foods*, Chem. Eng. Reg. Des., 67 (1989).

(List continued on next page.)

*Primary Examiner*—Anthony J. Weier
*Attorney, Agent, or Firm*—Bell, Seltzer, Park & Gibson, P.A.

[57] ABSTRACT

An electroconductive heater for heating a liquid product such as a liquid whole egg product which has a conductivity which increases with temperature, is disclosed. The electroconductive heater comprises an enclosed chamber defining a liquid product flow space, the enclosed chamber having an upstream end portion, a downstream end portion, and first and second electrically conductive plates positioned opposite one another in spaced relationship with the liquid product flow space therebetween. The first and second electrically conductive plates longitudinally extend from the upstream end portion to the downstream end portion. The chamber has a characteristic resistivity of the electrical pathway between the first electrically conductive plate and the second electrically conductive plate which is greater in the downstream end portion than in the upstream end portion. Apparatus and methods of using such electroconductive heaters are also disclosed.

13 Claims, 3 Drawing Sheets

OTHER PUBLICATIONS

Palaniappan et al., *Electrical Conductivity of Selected Solid Foods During Ohmic Heating*, Journal of Food Process Engineering, 14, 221–236 (1991).

Palaniappan et al., *Effects of Electricity on Microorganisms: A Review*, Journal of Food Processing and Preservation, 14, 393–414 (1990).

Halden et al., *Changes in the Electrical Conductivity of Foods During Ohmic Heating*, International Journal of Food Science and Technology, 25, 9–25, (1990).

Moses, *Electric Pasteurization of Milk*, Agricultural Engineering, 525–526 (1938).

Palaniappan, *Doctoral Dissertation*, Ohio State University (1991).

FIG. 2
FIG. 3
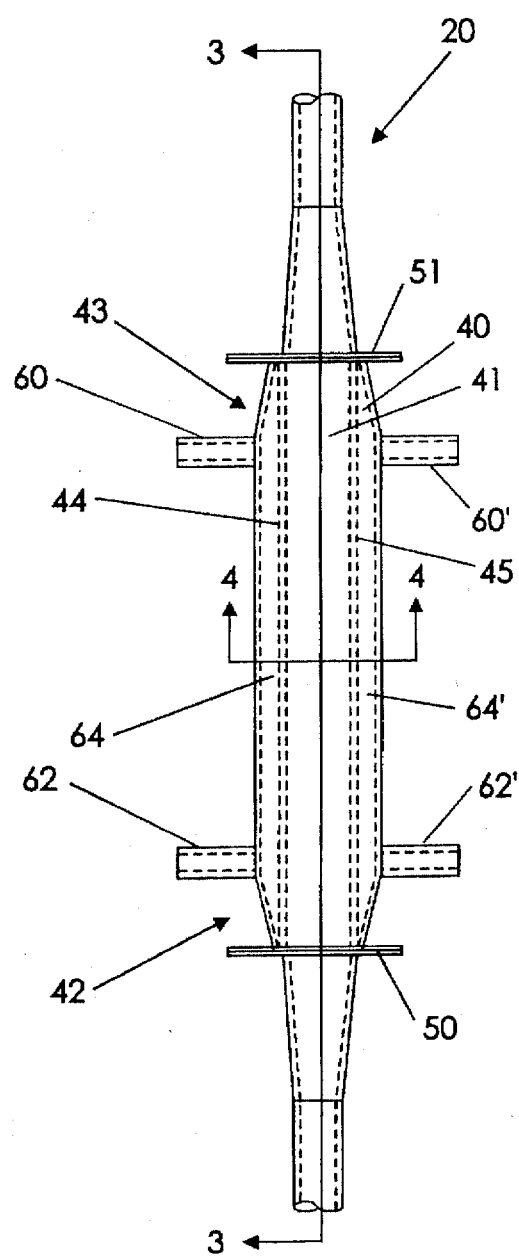
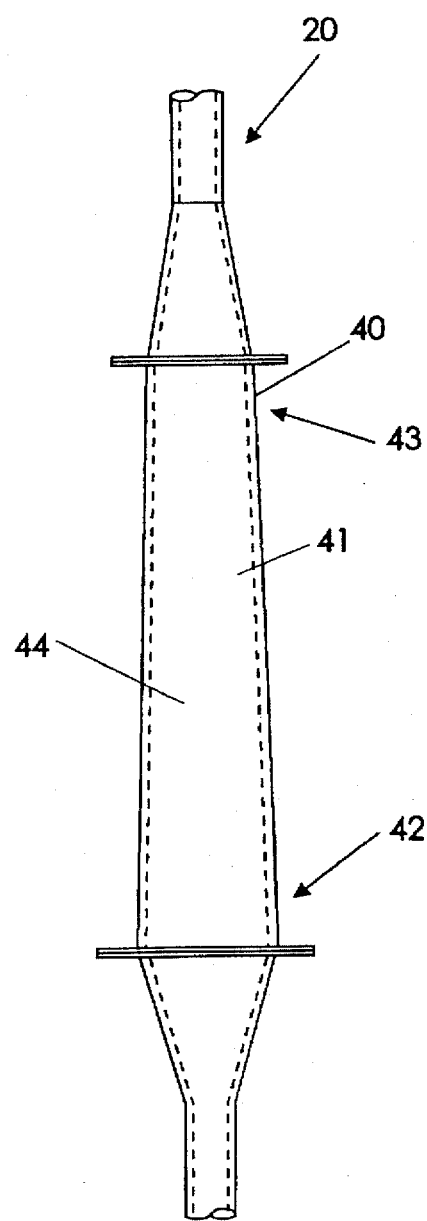
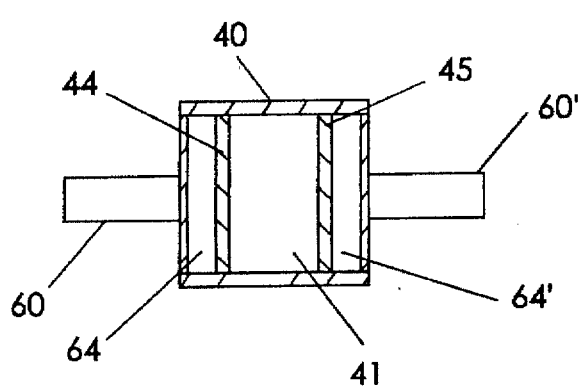
FIG. 4

METHOD FOR PASTEURIZING LIQUID WHOLE EGG PRODUCTS

This is a continuation of application Ser. No. 07/370,228 filed on Jan. 9, 1995, now abandoned which is a continuation of application Ser. No. 07/862,862 filed on 3, Apr. 1992, now abandoned.

FIELD OF THE INVENTION

The present invention concerns the pasteurization of liquid products such as liquid whole egg products by electroconductive heating.

BACKGROUND OF THE INVENTION

Large quantities of liquid egg products are pasteurized each year to produce products sold in refrigerated form with limited shelf life. See generally Egg Pasteurization Manual (USDA Agricultural Research Service 1969). More recently, the provision of techniques for ultrapasteurizing liquid egg products has led to considerable interest in marketing liquid egg products which have extended shelf lives under refrigerated conditions.

U.S. Pat. No. 4,808,425 concerns ultrapasteurizing liquid egg products in which the egg is heated by contacting to a heated surface. While opening the door to commercially viable, ultrapasteurized liquid whole egg products, a problem with this technology is the tendency of the heated surface to eventually foul. One alternative is to heat with steam (see, e.g., U.S. Pat. No. 4,957,760). Another alternative is the split stream pasteurization technique disclosed in U.S. Pat. No. 5,019,407.

An alternative approach to heating some products is to utilize electroconductive heating. As discussed in A. DeAlwis et. al., *Chem. Eng. Res. Des.* 67, 159 (1989), electroconductive heating, which is also referred to as ohmic heating, provides benefits in the heating of high particle content food products where food particles are defined as particles larger than about 2 mm in diameter. In electroconductive heating, heat is generated by passing an alternating current through a continuously flowing stream of food product. Because most foods contain electrolytic components, they are sufficiently conductive to allow an electrical current to pass directly through them. This direct heating approach allows heat to be generated within both the solid and liquid elements of the food product stream to thereby provide more uniform heating. Alternating currents are required because of problems with polarization and deposition found in such systems. (See also U.S. Pat. Nos. 4,739,140, 4,417,132 and 3,651,753; C. Biss et al., The Development and Application of Ohmic Heating For The Continuous Heating of Particulate Foodstuffs).

The object of previous electroconductive heating proposals was to allow for more rapid heating of the food products than is possible with heating by contact to a heated surface. More uniform heating is possible with electroconductive heating and the more rapid heating is especially beneficial for types of food products which are treated at temperatures as high as 140° C. One limitation on these electroconductive heating methods is that they are designed to operate properly when used with relatively high particulate content in the food product being heated. Studies have been performed applying such heating methods to liquids such as juices which do not have high particulate content but also do not suffer from problems with fouling like those associated with the heating of liquid products subject to protein coagulation. See S. Papaniappan and S. Sastry, *J. Food Proc.* 14, 247 (1991).

In view of the foregoing, an object of this invention is to provide a method of pasteurizing liquid egg products characterized by decreased fouling of heated surfaces therein and extended run times.

A further object of this invention is to provide an apparatus for pasteurization of liquid products having particle sizes less than about 2 mm and being subject to fouling caused by coagulation during heating.

A further object of this invention is to provide methods of continuously pasteurizing liquid egg products which allow accurate regulation of the temperature to which the liquid egg product is heated.

SUMMARY OF THE INVENTION

A process of pasteurizing a liquid whole egg product is disclosed. The process comprises passing the liquid whole egg product as a continuous stream through a pasteurizing apparatus, during which the liquid whole egg product is heated to a first temperature (e.g., by contacting the product to a heated surface), then heated (preferably by not more than 10° Centigrade) to a second temperature in a first electroconductive heater containing a first electrical heating means for providing an electrical voltage and current to said liquid whole egg product therein. After heating to the second temperature, the liquid whole egg product is optionally, but preferably, heated (preferably by not more than 10° Centigrade) to a third temperature in a second electroconductive heater containing a second electrical heating means for providing an electrical voltage and current to said liquid whole egg product therein. The liquid whole egg product is subjected to turbulence at least periodically in each of said electroconductive heaters. The first electrical heating means and the optional second electrical heating means are controlled to compensate for conductivity changes in the liquid whole egg product caused by heating to thereby control the rate of heating of the liquid whole egg product and the temperature to which the liquid whole egg product is heated so that fouling of the electroconductive heaters is reduced. Preferably, the total thermal treatment received by the liquid whole egg product during the process is at least sufficient to pasteurize the product.

In a preferred embodiment of the foregoing, the liquid whole egg product is heated at a substantially uniform rate within the first electroconductive heater and at a substantially uniform rate within the optional second electroconductive heater. It is also preferred that the thermal treatment received by the liquid whole egg product be sufficient to cause at least a seven log cycle reduction of *Listeria monocytogenes* in the product, and that the final heating step be followed by the step of aseptically packaging the liquid whole egg product to provide a packaged liquid whole egg product having a shelf life of at least four weeks, and typically four to thirty six weeks or eight to thirty six weeks, under refrigerated conditions.

A second aspect of the present invention is an apparatus for pasteurizing a liquid product. The apparatus comprises: (a) a liquid product line; (b) a pumping means connected to the liquid product line for establishing a liquid product stream in the liquid product line; (c) a preheater connected to the liquid product line and having a heating means therein for transfering energy to the liquid product; (d) a first electroconductive heater connected to the preheater and having a first electrical heating means therein for providing an electrical voltage and current to the liquid product, said first electroconductive heater having an outlet, (e) optionally, but preferably, a second electroconductive heater connected to the first electroconductive heater and having a second electrical heating means therein for providing an electrical voltage and current to the liquid product, the second electroconductive heater having an outlet; wherein the first and optional second electroconductive heaters are capable of compensating for changes in the conductivity of the liquid product stream therein of up to about 4 siemens/ meter; (f) power supply means electrically connected to the first electrical heating means and optional second electrical heating means for supplying power, preferably at a frequency of about 100 Hz to about 10,000 Hz, thereto; (g) temperature detecting means operatively connected to the first and optional second electroconductive heater outlets to detect the temperature of said liquid product stream at each of said electroconductive heater outlets; and (h) control means electrically connected to the power supply means and responsive to the first temperature detecting means and optionally to the second temperature detecting means for regulating the power supplied to the first electrical heating means and optional second electrical heating means by the power supply so that the liquid product stream is heated to the intended second, or optionally third, temperature.

A third aspect of the present invention is an electroconductive heater for a liquid product, which product has a conductivity which increases with temperature. The electroconductive heater comprises an enclosed chamber defining a liquid product flow space, the enclosed chamber having an upstream end portion, a downstream end portion positioned opposite the upstream end portion (and preferably above so that the direction of product flow is vertical), and first and second electrically conductive plates positioned opposite one another in spaced relationship with the liquid product flow space therebetween. The first and second electrically conductive plates longitudinally extend from the upstream end portion to the downstream end portion. The enclosed chamber preferably has compensation means for providing a characteristic resistivity of the electrical pathway between the first electrically conductive plate and the second electrically conductive plate which is greater in the downstream end portion than in the upstream end portion; the enclosed chamber preferably has a cooling means such as a water jacket in thermally conductive relation therewith for removing heat from the electrically conductive plates therein; the enclosed chamber preferably has a length and a characteristic dimension defining the liquid product flow space, with the length of the enclosed chamber being less than fifteen times the characteristic dimension of the enclosed chamber.

The foregoing and other objects and aspects of the present invention are explained in detail by the drawings herein and the specification set forth below.

BRIEF DESCRIPTION OF THE DRAWINGS

FIG. 2 illustrates a top view of an electroconductive heater in accordance with the present invention;

FIG. 3 illustrates a sectional side view of an electroconductive heater in accordance with the present invention taken along Line 3—3 of FIG. 2;

FIG. 4 illustrates a sectional end view of an electroconductive heater in accordance with the present invention taken along Line 4—4 of FIG. 2;

DETAILED DESCRIPTION OF THE INVENTION

Figure 1:
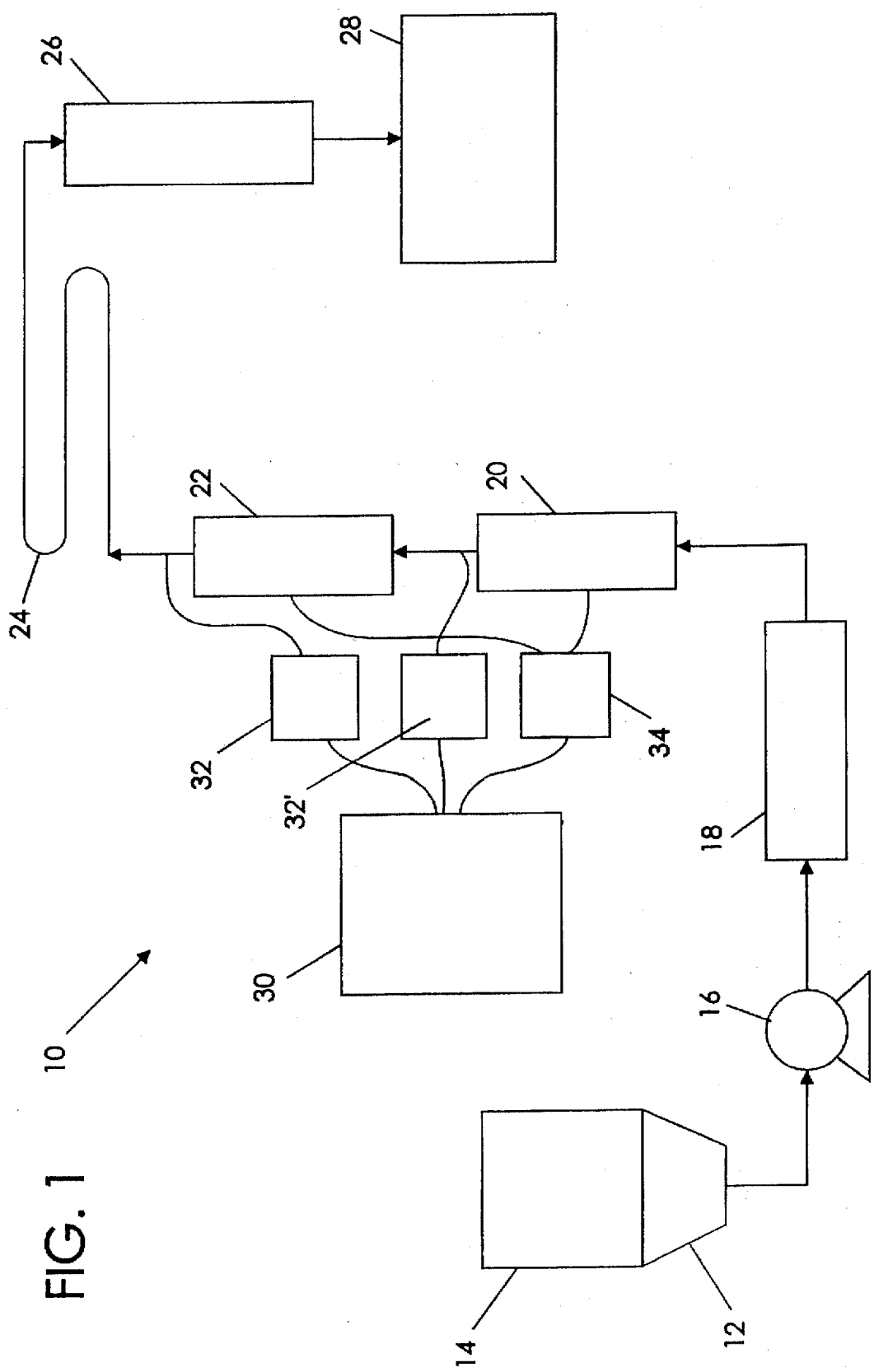
FIG. 1 schematically illustrates a pasteurization apparatus of the present invention which includes a first a plate heat exchanger followed by two electroconductive heaters, cooling, and an aseptic packaging apparatus.

The first heating step is preferrably indirect heating, such as by contacting the liquid product to a heated surface. In the initial indirect heating step, the liquid product is heated by contacting the product to a heated surface. The heated surface should be comprised of a corrosion-resistant, non-toxic and non-absorbent material such as stainless steel. Standards for evaluating the acceptability of such product contact surfaces (the 3-A Sanitary Standards) are known and established. See, e.g., *Egg Pasteurization Manual*, supra, at 27.

For a liquid whole egg product in this initial indirect heating step, the product is preferably heated to a temperature of at least about 40° C. As explained below, it is preferable to minimize the temperature difference between the first and second heating steps. Hence, in the first indirect heating step the product is more preferably heated to a temperature of at least about 50° C., and most preferably heated to a temperature of at least about 55° C. The final temperature for a liquid whole egg product is preferably less than about 75° C. exiting the final heating stage.

To obtain a superior pasteurized liquid product, the contact time of the liquid egg product to heated surfaces during the first or indirect heating step is preferably reduced. More particularly, every particle of liquid whole egg product should preferably be in contact with the heated surface or surfaces of the unit in which the indirect heating step is carried out for a total time less than the residence time of the particle in the heating unit. (The term "particle" as used herein has its standard meaning in the egg pasteurization field. See, e.g., 7 C. F. R. §59.570(b) (1985). This meaning is to be distinguished from the meaning of "particle" in the electroconductive heating references cited previously which generally refer to particle sizes greater than about 2 mm in diameter.). This is accomplished by mixing the product at least periodically while it is being heated. In a continuous flow pasteurizing apparatus, such mixing is accomplished by introducing turbulence into the stream of the product at least periodically while it is being heated, as discussed below. Other steps which are preferably employed to reduce fluid element contact time to heated surfaces include providing portions of the thermal treatment in which fluid elements are not in contact with heated surfaces, such as by providing a portion of the thermal treatment in a holding section, and by providing heated contact surface area to product volume ratios of less than 18 $cm^2/cm^3$. (Thus the surface area to volume ratio is preferably less than about 10, and is more preferably in the area of about 2).

It is also desirable to induce physical forces to make the product more homogeneous prior to thermal treatment, such as by inducing shear forces capable of reducing protein and fat unit size therein. This is preferably accomplished by dispersing the product prior to heating. Dispersing may be carried out with a dispersing valve or with a timing pump, as is known in the art. Such treatment advantageously reduces fouling, and serves to reduce any tendency of the product to coagulate. Such a dispersing step may be carried out by conducting a more rigorous homogenization step, but it is recommended that such more expensive homogenizing equipment be used as described below.

It is preferable to mix the liquid egg product at least periodically during the first heating step. As noted above, in continuous flow equipment mixing is carried out by at least periodically subjecting the stream of liquid egg product to turbulence while it is heated. Turbulence, which is the mixing of particles over the cross-section of the product stream, is discussed in the *Egg Pasteurization Manual* at pages 6–8. Such turbulence is characterized by a Reynolds number greater than about 2,300, and preferably greater than about 4,600. Commercial high temperature, short time pasteurizing units are available which at least periodically impart turbulence to the stream of product being pasteurized while the product is being heated. For the purposes of the present invention, greater levels of turbulence during the indirect heating step are preferred. Thus, the liquid egg product is preferably subjected to turbulence for a major portion of the time it is heated. Plate heat exchangers, trombone heat exchangers, spiral heat exchangers, and scrape surface heat exchangers are illustrative of the types of known heat exchangers which can be used to subject liquid egg products to turbulence while they are heated by contact to a heated surface. The physical forces induced in scrape surface heat exchangers are generally thought of as "mixing," but these exchangers induce turbulence at least in regions of the product stream, and are therefore considered to induce turbulence for purposes of the present invention.

The thermal treatment received by the liquid product using the apparatus and methods of the present invention may be characterized as a total thermal treatment. As is schematically shown in FIG. 1, continuous flow thermal processing equipment comprises heating, holding, and cooling sections. The thermal treatment received by the liquid product in the heating and cooling stages is oftentimes not considered, instead, only the holding time and temperature are considered. However, when products are pasteurized in such equipment at higher temperatures the contribution of the heating stage and the cooling stage to the total thermal treatment of the product becomes important. Therefore, the thermal treatment of the liquid products in the methods of the present invention is best characterized in terms of the total thermal treatment. For a discussion of a mathematical method for characterizing total thermal treatments see U.S. Pat. No. 4,808,425.

A pasteurizing apparatus according to the present invention and suitable for carrying out the methods of the present invention is shown in FIG. 1. The pasteurizing apparatus 10 includes a liquid product inlet 12 which may further include a product feed tank 14. The apparatus further includes a pump 16, a first heater or preheater 18, a first electroconductive heater 20, a second electroconductive heater 22, a holding tube 24, a cooler 26 and a packager 28. These preceding elements are linked together by a liquid product line 29 which carries the liquid product. The electroconductive heaters are controlled by a controller 30 which is responsive to temperature sensors 32 and 32' which detect the temperature of the liquid product stream exiting the electroconductive heaters 20 and 22. The controller 30 changes the heat provided to the liquid product within electroconductive heaters 20 and 22 by changing the output to those heaters from power supply 34.

The liquid product flows from the liquid product feed tank 14 and through the product inlet 12. It is pumped through the pasteurizer at the desired flow rate by pump 16. It is heated to a first temperature in preheater 18, then heated to a second temperature in electroconductive heater 20, and a third temperature in electroconductive heater 22. The temperature of the product is increased by each heating step. The product is then held at the elevated temperature in holding tube 24 for a time sufficient to provide a total thermal treatment sufficient to pasteurize the product, then cooled in cooler 26 before being aseptically packaged in packager 28. Each of the electroconductive heaters contains electrodes serving as an electrical heating means for providing an electrical voltage and current to the liquid product, and is configured to subject the product to turbulence during heating and to compensate for the conductivity changes in the liquid product as it is heated as will be discussed more fully with respect to FIGS. 2, 3 and 4. The temperature of the product exiting heaters 20 and 22 is detected by temperature sensors 32 and 32' in response to which controller 30 adjusts the output of power supply to each electroconductive heater. The electroconductive heaters are operated to reduce fouling by using an alternating signal.

In the electroconductive heating stage, the product is heated by two electroconductive heaters. It is beneficial to use multiple heaters to overcome the difficulties associated with electroconductive heating of liquid products, such as eggs and blood, which do not have the large particle size and concentration of the products previously treated with electroconductive heating and, unlike juices and other such non-particulate products, are subject to coagulation and fouling of the heating equipment. Products such as liquid whole egg products and liquid blood products have a further problem in that the maximum temperature to which they may be heated without seriously degrading their functional qualities is much lower than those of many of the products previously treated with electroconductive heating. It is, therefore, important to maintain accurate control over the heating process to allow heating to higher temperatures without product degradation. Using multiple electroconductive heating steps allows a reduced temperature increase in each unit and a shorter residence time, both of which allow improved control over the final temperature to which the liquid product is heated. As will be discussed, this improvement is further enhanced by the heater design of the present invention which compensates for the changes in conductivity of the liquid product with temperature to reduce the variation in the heating rate of the product within each heater. Preferably, this is accomplished where each heater has a greater characteristic resistivity adjacent the heater outlet than adjacent the heater inlet to compensate for changes in the conductivity of the liquid product stream within the heater. Because the conductivity change of the product depends on the specific product being heated, such a heater may be configured for heating a liquid whole egg product or for heating a liquid whole blood product and where conductivity changes are not uniform the configuration may be designed for a specific inlet and outlet temperature.

Because of the risk of coagulation and loss of functional qualities of the liquid products treated by the methods and apparatus of the present invention, it is desirable that the product be subjected to turbulence during the electroconductive heating steps. A means is preferably provided for subjecting the liquid product stream to turbulence for a major portion of the time the liquid product is heated. Turbulence is only present in electroconductive heaters near the product stream inlet end and outlet end of the heaters. This turbulence is created by the edge effects at the transitions between the liquid product lines and the heaters. The internal shape of the electroconductive heaters is determined by the need to maintain a uniform electrical field throughout the product stream to insure uniform heating of the product. Mechanical shape variations to induce turbulence within the heater would result in variations in the magnetic field and consequently non-uniform heating. Therefore, the present invention preferably limits heater lengths and/or controls the average particle residence time within each heater to insure turbulence while the product is being electroconductively heated. The average particle residence time is a function of the product flow rate and the cross-sectional dimensions of the electroconductive heaters as well as the length of the electroconductive heaters. Preferably, this turbulence is present for a major portion of the time the product is heated in the electroconductive heaters. Most preferably, the product is subjected to turbulence at all times during electroconductive heating. The average residence time of any particle of the continuous stream of the liquid product within each electroconductive heater is preferably no more than about 20 seconds. More preferably, the average residence time of any particle of the liquid product within each electroconductive heater is no more than about 10 seconds.

The enclosed chamber defining the liquid flow pathway of the heaters of the present invention may be characterized by a characteristic dimension. The characteristic dimension is:

$$D = 4A_{avg}/P_{avg}$$

where $A_{avg}$ is the average of the cross-sectional area of the liquid flow pathway of the heater and $P_{avg}$ is the average perimeter of the liquid flow pathway of the heater. In general, in pipe type flow, fully developed flow is not present until the length of the pathway is 40 times the characteristic dimension. Therefore, it is preferable that the heater enclosed chamber length of the electroconductive heater is less than 40 times its characteristic dimension so that the liquid product stream within the heater is at least periodically subjected to turbulence during heating. However, to insure sufficient turbulence to gain the full benefits of the present invention, it is more preferred that the heater enclosed chamber length be no more than fifteen times the characteristic dimension of the electroconductive heater. Most preferably, the heater enclosed chamber length will be no more than ten times the characteristic dimension of the electroconductive heater.

The heating rate of the product within the electroconductive heaters is a function of the electrical conductivity of the product as well as the current flow through the product. Because electroconductive heaters have a limited power supply and are only capable of generating a limited amount of voltage, the heating rate is faster with higher conductivities where the heaters are able to generate higher current flows. The generation of heat for a simple resistive model may be mathematically expressed as follows:

$$Q = I^2 R$$

where I is the current through the product and R is the resistance of the product. Furthermore:

$$R = G/(A\sigma)$$

where G is the gap between the electrodes of the electrical output of the heater (which for a plate type electrode is the distance between the first and second electrically conductive plate), A is the cross-sectional area of the product flow path of the heater, and $\sigma$ is the electrical conductivity in siemens/meter of the product. These basic model relationships have been applied in Palaniappan et. al., supra, using a simplified energy balance equation to define an equation for the heating rate of the product, using juices, as follows:

$$(dT/dt) = (V^2\sigma)/(K_c m C_p)$$

where V is the voltage across the product in the electroconductive heater, i.e., the voltage across the electrodes, $K_c$ is L divided by A, m is the mass of the product in the electroconductive heater, and $C_p$ is the specific heat of the product in joules/kilogram °C.

Figure 5:
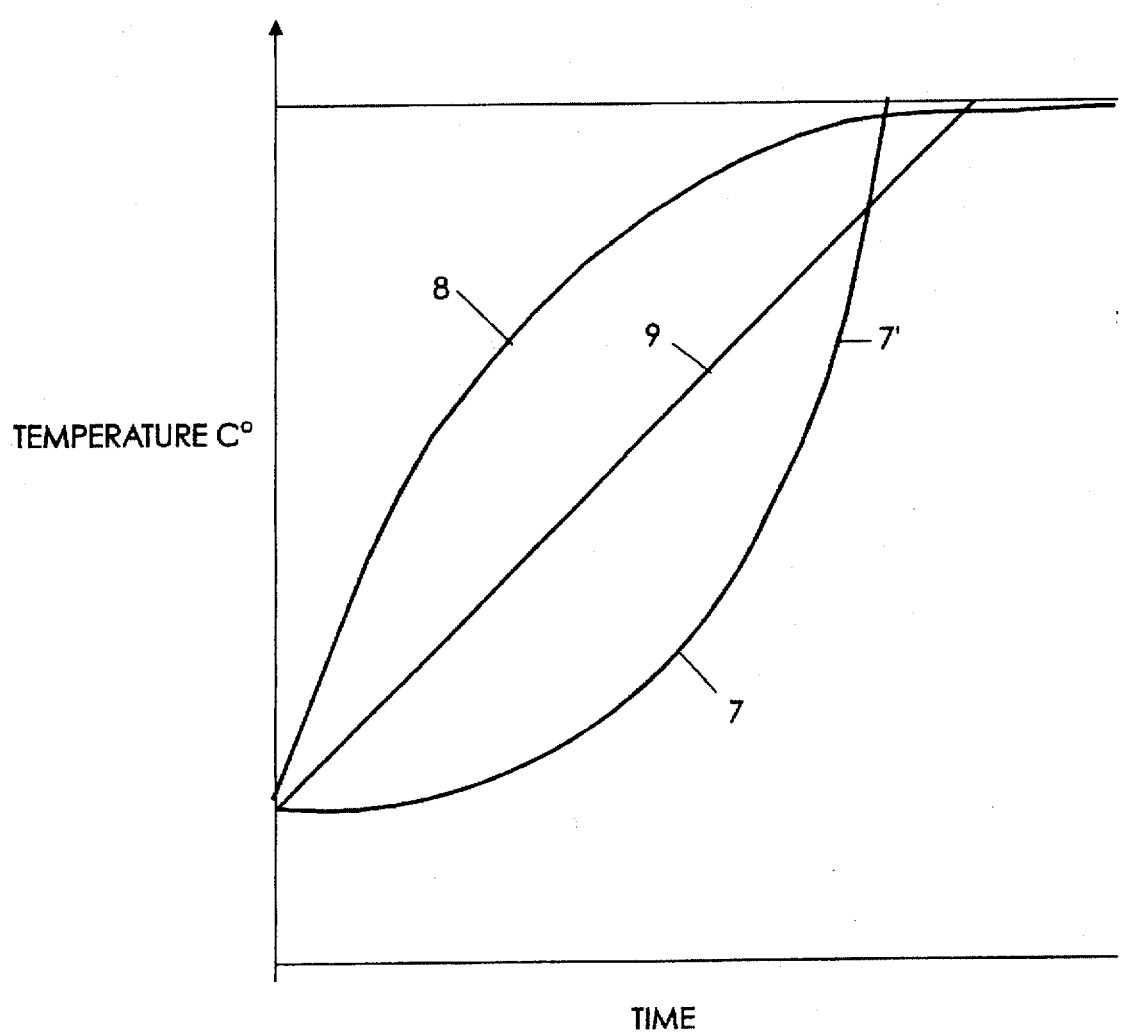
FIG. 5 illustrates the heating curves for conventional contact type heaters, previously known electroconductive heaters, and an electroconductive heater in accordance with the present invention.

The analysis of heating rates in electroconductive heaters is further complicated by the fact that the conductivity of the product increases as the temperature of the product increases. This means that the product heats more rapidly for a given electrical input voltage as the temperature of the product increases. This increase in heating rate with temperature is illustrated in FIG. 5 as line 7. The steep slope of the line at higher temperatures as at 7' indicates a very high and difficult to control heating rate. In contrast, traditional indirect heating methods, such as by contact to a heated surface, exhibit the characteristics of line 8 in FIG. 5 as a result of the reduced difference in temperature between the heated surface and the liquid product being heated as the product's temperature increases.

The variations in conductivity with temperature are sometimes non-linear and are specific to the particular product being heated. An understanding of the conductivity throughout the temperature range of interest for a particular product is important to allow for accurate control of heating rates and product temperature during electroconductive heating. This is especially true for products such as liquid whole egg products and liquid blood products which are subject to protein coagulation and loss of functionality during heating at temperatures close to those used during pasteurization. It is preferable, in accordance with the present invention to select a heater design which overcomes the natural tendancy to increasing heating rates and provides a substantially uniform heating rate. Most preferably, a substantially linear heating rate is provided as illustrated by line 9 in FIG. 5.

This control over heating rate is provided by constructing the electroconductive heater to incorporate a compensation means to compensate for the changes in the conductivity of the product. To insure good control of the product exiting the electroconductive heaters, each electroconductive heater in the present invention is preferably designed to be capable of compensating for changes in the conductivity of the liquid product therein of up to about 4 siemens/meter with the increase in the temperature of the product within each electroconductive heater being limited to insure no more than about a 4 siemens/meter change in the product's conductivity from the upstream end portion of the heater to the downstream end portion of the heater. More preferably, each electroconductive heater in the present invention is designed to be capable of compensating for changes in the conductivity of the liquid product therein of up to about 4 siemens/meter with the increase in the temperature of the product within each electroconductive heater being limited to insure no more than a 2 siemens/meter change in the product's conductivity from the upstream end portion to the downstream end portion of the heater.

The heater may be designed to compensate for changes in conductivity of the product by varying the characteristic resistivity of the heater between the upstream end portion and the downstream end portion. The characteristic resistivity at any point along the length of the liquid product flow pathway is defined as:

$$CD = G_n/A_n$$

where $G_n$ is the electrode gap at a point n between the inlet and the outlet of the heater, which for a plate type electrode is the distance between the first and second electrically conductive plates, and $A_n$ is the area of a finite strip of the electrode at the same point n. For computational purposes, a unitary strip of 1 centimeter may be assumed in calculating $A_n$.

In a preferred embodiment of the invention the characteristic resistivity is varied to produce a substantially constant heating rate. This may be accomplished by varying $G_n$ or $A_n$ in proportion to changes in σ so that the resistance, R, of the electrical pathway is constant at all points n along the liquid flow pathway in the heater. This causes the power input to the product to be constant at all points and because the liquid product is substantially incompressible and the mass flow rate is constant the resulting heating rate is also constant.

In a preferred embodiment of the present invention as illustrated in FIGS. 2, 3 and 4 the characteristic resistivity is controlled by varying $A_n$. In the Figures, electroconductive heater 20 includes an enclosed chamber 40 defining a liquid product flow space 41. Enclosed chamber 40 has an upstream end portion 42, an inlet 50, a downstream end portion 43 which is opposite upstream end portion 42, and an outlet 51. The distance between inlet 50 and outlet 51 defines the length of enclosed chamber 40. Enclosed chamber 40 further has a first electrically conductive plate 44 and a second electrically conductive plate 45 positioned opposite and spaced apart from plate 44 with liquid product flow space 41 between plates 44 and 45. The distance between plates 44 and 45 at any point defines the electrode gap. Electrically conductive plates 44 and 45 extend longitudinally from upstream end portion 42 to downstream end portion 43. The heater illustrated provides a compensation for changes in the conductivity of the product with temperature by varying $A_n$ by having the width of electrically conductive plates 44 and 45 greater in upstream end portion 42 then in downstream end portion 43 as can be seen in FIG. 3. In the embodiment illustrated the width decreases linearly to provide for a uniform characteristic resistivity and a constant heating rate for a product with a linear increase in conductivity with temperature where the rate of decrease of the width is proportionate to the rate of increase of the product conductivity. The apparatus may further comprise a signal means or power supply 34 and controller 30 as illustrated in FIG. 1 electrically connected to plates 44 and 45 which provides the electrical potential between plates 44 and 45 and may provide a desired current or voltage at a desired frequency.

Also illustrated in FIGS. 2 and 4 is a temperature control means for regulating the temperature of plates 44 and 45. The temperature control means includes inlet and outlet 62 connected to chamber 64 allowing a cooling fluid such as water to flow from inlet 60 to outlet 62 through chamber 64 to maintain the temperature of plate 44. Similarly, inlet 60' and outlet 62' connected to chamber 64' maintain the temperature of plate 45.

Improved control of the products temperature can also be obtained by limiting the temperature increase within each electroconductive heater. Preferably, the temperature of the product within each electroconductive heater is raised by not more than about 15° C. More preferably, the temperature is raised not more than about 10° C., and most preferably the temperature is raised not more than about 5° C.

Fouling of electroconductive heaters occurs when the product being heated sticks to the surface of the electrical output of the heater. The electrical output of the electroconductive heater is a pair or pairs of electrodes which are used to deliver an electrical current to the product. While such heaters may be driven by a direct current, superior performance is obtained by using an alternating current to reduce polarization and fouling problems of direct current systems. Electroconductive heating systems presently on the market generally utilize an alternating frequency matching the main frequency, for example, 60 hertz. Fouling of electrodes is still a significant problem with these systems, requiring specialized plating of the electrodes, with the problem of fouling being even more severe when processing products such as liquid whole egg products and liquid blood products. To overcome these problems, the present invention uses higher frequencies than previously used. Preferably, the electrical heating means such as a plate electrode is operated at a frequency of from about 100 hertz to about 10000 hertz. More preferably, the electrical heating means such as a plate electrode is operated at a frequency of from about 250 hertz to about 2500 hertz.

The most preferable method of electroconductive heating to allow accurate temperature control and minimize fouling is to provide a constant heating rate throughout the heating process as illustrated by line 9 of FIG. 5. Using this objective and knowing the characteristics of the liquid product being heated appropriate dimensions for an electroconductive heater embodying the present invention may be selected. One method of doing so is to select a desired inlet and outlet temperature for the heater and a heating rate which is low enough to provide for good control over temperature of the liquid product.

An example of an electroconductive heater according to the present invention where compensation for changes in the conductivity of the product with temperature is provided by varying $A_n$ by having the width of electrically conductive plates 44 and 45 greater in upstream end portion 42 than in downstream end portion 43 is as follows. The heater is designed to raise the product temperature from 55° C. to 65° C. with a heating rate of 1° C./second and a residence time of 10 seconds. The liquid product has a conductivity of 1 siemen/meter at 55° C. and 1.2 siemens/meter at 65° C. with a substantially linear increase in conductivity, a density of about 1 gram/cubic centimeter, and a thermal capacity of 3600 joules/kilogram° C. The width of plates 44 and 45 in upstream end portion 42 at inlet 50 is 3 centimeters and in downstream end portion 43 at outlet 51 is 2.5 centimeters. The gap between the plates is 2 centimeters and the length of enclosed chamber 40 is 20 centimeters. For this heater the characteristic dimension is 2.32 centimeters and the length is less than ten times the characteristic dimension. The heating rate throughout the heater is constant. The volume flow rate is 11 cubic centimeters per second providing a mass flow rate of 0.011 kilograms/second. For a simple energy balance assuming no heat losses the power requirement is the product of the mass flow rate, thermal capacity and the heating rate which is 396 watts. The voltage required is the square root of the power times the total resistance which is 36.33 volts where the frequency in this example is 1 kilohertz with a voltage gradient of 18.16 volts/centimeter.

A further example using the same design objectives and product but providing compensation by varying the gap between plates 44 and 45 between upstream end portion 42 and downstream end portion 43 is as follows. The gap between plates 44 and 45 in upstream end portion 42 at inlet 50 is 2.5 centimeters and in downstream end portion 43 at outlet 51 is 3 centimeters. The width of the plates is 3 centimeters and the length of enclosed chamber 40 is 20 centimeters. For this heater the characteristic dimension is 2.87 centimeters and the length is less than ten times the characteristic dimension. The heating rate throughout the heater is constant. The volume flow rate is 16.5 cubic centimeters per second providing a mass flow rate of about 0.017 kilograms/second. For a simple energy balance assuming no heat losses the power requirement is 612 watts. The voltage required is 50.5 volts where the frequency in this example is 1 kilohertz.

The compensation for changes in conductivity of the product may of course be accomplished in a variety of ways not just those which have been illustrated. While it is preferable to vary the width of both plates, varying the width of only one plate will allow for varying the characteristic resistivity. The material of one or both of the plates could also be selected to have some resistivity so that the power could be connected at the upstream end portion providing a greater characteristic resistivity in the downstream end portion. One of the plates could also be configured as a plurality of smaller plates with each having its own electrical connection with the electrical connection having greater resistivity for those plates in the downstream portion. Other means can of course provide the same capability for providing compensation for variations in conductivity to allow a more uniform heating rate within the heater and improved control over heating. Furthermore, a variety of these means could be combined within a electroconductive heater or different means could be used in different heaters in the pasteurizing apparatus.

The holding time following the final electroconductive heating step for liquid whole egg products must be sufficient to cause the total thermal treatment received by the product to result in at least a nine log cycle reduction of Salmonella bacteria in the product. The term "holding time," as used herein, has its ordinary meaning as used in the egg processing industry, and all log cycle reductions referred to herein concern the processed product as compared to the raw, unprocessed product. Preferably, the holding time is sufficient to produce a product having a shelf life of at least four weeks under refrigerated conditions. Most preferably the holding time is sufficient to cause a seven log cycle reduction in *Listeria monocytogenes* in the product, as required by the applicable government standards regulating the sale of such products.

For liquid whole egg products, it is preferable that a homogenization step be included after the product has been maintained at the second predetermined temperature. The term "homogenize," as used herein, means to subject a product to physical forces to reduce particle size. Such procedures are known in the art, and may be carried out on different types of equipment. It is preferable to carry out this homogenizing step with homogenizing equipment at total pressures of from about 500 p.s.i. to about 3,000 p.s.i.

Examples of liquid whole egg products which can be ultrapasteurized by the method of the present invention include whole egg, fortified whole egg (whole egg with added yolk), salt whole egg (e.g., salt 10%), sugar whole egg (e.g., sugar 10%), blends of whole egg with syrup solids, syrups, dextrose and dextrins and/or gums and thickening agents, blends of whole eggs with less than 1% sugar and/or salt, scrambled egg mixes (for example, a mix of about 51% egg solids, 30% skim milk solids, 15% vegetable oil and 1.5% salt), reduced cholesterol egg products and blends thereof, custard blends, and the like, that is, products containing at least about 10% egg solids. Products which are extremely sensitive to thermal processing and which are particularly suitable for ultrapasteurization by the present invention include, for example, liquid whole egg and blends thereof (less than 2% added non-egg ingredients), fortified whole egg and blends thereof (24–38% egg solids, 2–12% added non-egg ingredients), liquid salt whole egg, liquid sugar whole egg, and other liquid whole egg blends which are 24–38% egg solids and 12% or less of added non-egg ingredients. Terms used herein have their standard meaning in accordance with industry and regulatory usage. See, e.g., 7 C. F. R. §59,570(b) (1985).

To obtain a product with reduced amounts of spoilage micro-organisms, the pasteurizing apparatus should be sterilized before the liquid whole egg product is passed therethrough. Sterilizing is preferably accomplished by passing hot water under pressure through the pasteurizing apparatus, as is known in the art, so that hot water is contacted to those surfaces which contact the product at a temperature and pressure and for a time sufficient to sterilize these surfaces.

In addition, the product, after pasteurization, should be aseptically packaged. Aseptically packaged means packaged to the exclusion of microorganisms other than those carried by the liquid egg product itself. Equipment suitable for aseptically packaging liquid egg products is commercially available. Also useful in carrying out this step is equipment which packages the product to the substantial exclusion of microorganisms, known in the industry as "clean fillers."

Those skilled in the art will appreciate that minor variations can be made in the procedures described herein without departing from the present invention. For example, where reference is made to two heating steps, additional heating steps can be included without departing from this invention.

The foregoing is illustrative of the present invention, and not to be taken as limiting thereof. The invention is defined by the following claims, with equivalents of the claims to be included therein.

That which is claimed is:

1. A process of ultrapasteurizing a liquid whole egg product, comprising:

passing the liquid whole egg product as a continuous product stream through a pasteurizing apparatus, and heating said product stream to a first temperature of at least 40° C. by contacting said product stream to a heated surface, and then heating said product stream to a second temperature higher than said first temperature in an electroconductive heater containing an alternating current electrical heating means for providing an electrical voltage and current to said product stream therein, wherein said second temperature is not more than 15° C. higher than said first temperature; and then holding the product stream for a holding time at least sufficient to provide a total thermal treatment to the liquid whole egg product sufficient to pasteurize the product; and then aseptically packaging said liquid whole egg product to provide a packaged liquid whole egg product having a shelf life of four to thirty-six weeks under refrigerated conditions;

wherein said electroconductive heater is controlled to compensate for conductivity changes in said liquid whole egg product caused by heating to thereby control the rate of temperature change of said liquid whole egg product;

and wherein said electroconductive heater is capable of compensating for changes in the conductivity of said liquid whole egg product therein of up to about 4 siemens/meter.

2. A process according to claim 1, wherein any particle of said continuous stream of liquid whole egg product resides within said electroconductive heater no more than about 20 seconds.

3. A process according to claim 2, wherein any particle of said continuous product stream of liquid whole egg product resides within said electroconductive heater no more than about 10 seconds.

4. A process according to claim 1, wherein any particle of said continuous stream of liquid whole egg product is subjected to turbulence for a major portion of the time said particle of said continuous stream of liquid whole egg product is heated.

5. A process according to claim 1, wherein said liquid whole egg product is at least periodically subjected to turbulence in said electroconductive heater.

6. A process according to claim 1, wherein said liquid whole egg product is heated at a substantially uniform rate within said electroconductive heater.

7. A process according to claim 1, wherein said electrical heating means is operated at a frequency of from about 100 hertz to about 10,000 hertz.

8. A process of ultrapasteurizing a liquid whole egg product, comprising:

passing the liquid whole egg product as a continuous product stream through a pasteurizing apparatus;

heating said product stream to a first temperature of at least 40° C. by contacting said product stream to a heated surface;

heating said product stream to a second temperature higher than said first temperature in an electroconductive heater containing an alternating current electrical heating means for providing an electrical voltage and current to said product stream therein, wherein said second temperature is not more than 15° C. higher than said first temperature;

holding the product stream for a holding time at least sufficient to provide a total thermal treatment to the liquid whole egg product sufficient to pasteurize the product; and aseptically packaging said liquid whole egg product to provide a packaged liquid whole egg product having a shelf life of four to thirty-six weeks under refrigerated conditions;

wherein said electroconductive heater is controlled to compensate for conductivity changes in said liquid whole egg product caused by heating to thereby control the rate of temperature change of said liquid whole egg product;

and wherein said electroconductive heater has a greater characteristic resistivity adjacent the heater outlet then adjacent the heater inlet for compensating for changes in the conductivity of said liquid whole egg product therein of up to about 4 siemens/meter; and wherein said electroconductive heater has a chamber length less than 40 times its characteristic dimension, wherein said characteristic dimension is four times the cross-sectional area of the liquid flow pathway of the heater divided by the average perimeter of the liquid flow pathway of the heater.

9. A process according to claim 8, wherein any particle of said continuous stream of liquid whole egg product resides within said electroconductive heater no more than about 20 seconds.

10. A process according to claim 8, wherein any particle of said continuous product stream of liquid whole egg product resides within said electroconductive heater no more than about 10 seconds.

11. A process according to claim 8, wherein said liquid whole egg product is heated at a substantially uniform rate within said electroconductive heater.

12. A process according to claim 8, wherein said electrical heating means is operated at a frequency of from about 100 hertz to about 10,000 hertz.

13. A process of ultrapasteurizing a liquid whole egg product, comprising:

passing the liquid whole egg product as a continuous product stream through a pasteurizing apparatus;

heating said product stream to a first temperature of at least 40° C. by contacting said product stream to a heated surface;

heating said product stream to a second temperature higher than said first temperature in an electroconductive heater containing an alternating current electrical heating means for providing an electrical voltage and current to said product stream therein, wherein said second temperature is not more than 15° C. higher than said first temperature;

controlling said electroconductive heater to compensate for temperature and conductivity changes in said liquid whole egg product caused by heating to thereby control the rate of temperature change of said liquid whole egg product;

compensating for product stream conductivity change wherein said electroconductive heater has a greater characteristic resistivity adjacent the heater outlet than adjacent the heater inlet for compensating for changes in the conductivity of said liquid whole egg product by changing the conductivity of the electroconductive heater therein of up to about 4 siemens/meter;

providing turbulence to said product stream for a major portion of the time the product is heated in said electroconductive heater by configuring said electroconductive heater to have a chamber length less than 40 times its characteristic dimension and said characteristic dimension is four times the cross-sectional area of the liquid flow pathway of the heater divided by the average perimeter of the liquid flow pathway of the heater, wherein said heater chamber length and characteristic dimension are sized to provide turbulence and minimize variation in the heating rate of the product within said electroconductive heater;

holding the product stream for a holding time at least sufficient to provide a total thermal treatment to the liquid whole egg product sufficient to pasteurize the product; and aseptically packaging said liquid whole egg product to provide a packaged liquid whole egg product having a shelf life of four to thirty-six weeks under refrigerated conditions.

\* \* \* \* \*